(12) United States Patent
Altmikus et al.

(10) Patent No.: US 10,598,150 B2
(45) Date of Patent: Mar. 24, 2020

(54) WIND TURBINE WITH OPTICAL PRESSURE SENSORS AND METHOD FOR OPERATING A WIND TURBINE

(71) Applicant: WOBBEN PROPERTIES GMBH, Aurich (DE)

(72) Inventors: Andree Altmikus, Aurich (DE); Marvin Kuhn, Rastede (DE); Christian Napierala, Aurich (DE); Jürgen Stoltenjohannes, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/315,302

(22) PCT Filed: Jun. 5, 2015

(86) PCT No.: PCT/EP2015/062564
§ 371 (c)(1),
(2) Date: Nov. 30, 2016

(87) PCT Pub. No.: WO2015/185720
PCT Pub. Date: Dec. 10, 2015

(65) Prior Publication Data
US 2017/0191464 A1 Jul. 6, 2017

(30) Foreign Application Priority Data
Jun. 6, 2014 (DE) .................. 10 2014 210 949

(51) Int. Cl.
*F03D 7/04* (2006.01)
*F03D 7/02* (2006.01)
*F03D 1/06* (2006.01)
*F03D 17/00* (2016.01)
*G01L 11/02* (2006.01)

(52) U.S. Cl.
CPC .......... *F03D 7/046* (2013.01); *F03D 1/0675* (2013.01); *F03D 7/02* (2013.01); *F03D 7/0224* (2013.01); *F03D 7/0296* (2013.01); *F03D 17/00* (2016.05); *G01L 11/025* (2013.01); *F03D 7/022* (2013.01); *F03D 7/04* (2013.01); *F05B 2270/301* (2013.01); *F05B 2270/324* (2013.01); *F05B 2270/804* (2013.01); *Y02E 10/721* (2013.01); *Y02E 10/723* (2013.01)

(58) Field of Classification Search
CPC ...... F03D 7/0224; F03D 7/0296; F03D 7/046; F03D 17/00; F03D 80/00; F03D 1/0675; G01L 3/245; G01L 11/025
See application file for complete search history.

(56) References Cited

U.S. PATENT DOCUMENTS 7,159,468 B2    1/2007    Skinner et al.
7,909,575 B2    3/2011    Barbu et al.
(Continued)

FOREIGN PATENT DOCUMENTS

| CN | 101334004 A | 12/2008 |
|---|---|---|
| EP | 1975589 A2 | 10/2008 |
| WO | 2012122669 A8 | 9/2012 |

*Primary Examiner* — Sean Gugger
(74) *Attorney, Agent, or Firm* — Seed Intellectual Property Law Group LLP

(57) ABSTRACT

Wind turbine with at least one rotor blade and at least one optical pressure sensor arranged on the rotor blade, and method for operating the wind turbine.

20 Claims, 4 Drawing Sheets

(56) References Cited

U.S. PATENT DOCUMENTS

| | | | |
|---|---|---|---|
| 2007/0160338 A1* | 7/2007 | Mortensen | G01M 11/086 385/134 |
| 2009/0016880 A1* | 1/2009 | Bosselmann | G01L 3/245 416/61 |
| 2010/0087960 A1* | 4/2010 | Hayashi | F03D 7/0204 700/287 |
| 2013/0078095 A1* | 3/2013 | Olesen | F03D 7/022 416/61 |
| 2014/0054894 A1* | 2/2014 | Olesen | F03D 11/0091 290/44 |
| 2014/0356165 A1 | 12/2014 | Xiong et al. | |
| 2015/0168352 A1* | 6/2015 | Sohn | F03D 17/00 73/643 |
| 2016/0131111 A1* | 5/2016 | Olesen | F03D 7/0228 416/1 |
| 2017/0241957 A1* | 8/2017 | Sohn | G01N 29/2418 |

* cited by examiner

WIND TURBINE WITH OPTICAL PRESSURE SENSORS AND METHOD FOR OPERATING A WIND TURBINE

BACKGROUND

Technical Field

The invention relates to a wind turbine with optical pressure sensors and to a method for operating such a wind turbine.

Description of the Related Art

According to the prior art, wind turbines are exposed to winds with different properties which in particular strike the rotor blades of the wind turbine from different directions and with different strengths. With these different wind conditions, the wind turbines convert kinetic energy which is extracted from the wind into electrical energy and feeds the latter into a supply grid. When converting the wind energy into electrical energy, the wind turbine is operated, depending on the wind conditions and a predetermined electrical output which needs to be fed in, at different operating points, wherein each operating point is determined in particular by a blade pitch angle and a generator torque to be set.

The operating point is hereby set as ideally as possible in order to enable efficient operation whilst considering a long service life and increasingly also whilst respecting low levels of operating noise. Efficient means, in particular, generating as much energy as possible from the available wind. Operating noise, which is caused especially by turbulence at the rotor blades, hereby needs to be minimized in particular when the wind turbine is erected in the vicinity of residential areas so that the residents are not disturbed by the noise of the rotor blades of the wind turbine.

In order to meet the said requirements for operation, rotor blades are usually developed and simulated with the aid of a computer, wherein the actual behavior of the rotor blades thus developed is also verified using models in practical trials in a wind tunnel. During development, the rotor blades are, for example, developed so that they are adapted to the wind conditions prevailing at the erection site.

The control devices and/or regulating devices of a wind turbine, which set and/or regulate the ideal operating point of the turbine, are accordingly adapted to the properties of the respective rotor blade. To do this, a type of rotor blade model, which in the most simple case consists of one or more conversion tables, is saved in the control device and/or the regulating devices. Using the rotor blade model and taking into account the measured wind conditions, an operating point is then set and/or regulated so that an estimated situation of airflow onto the rotor blade is achieved. The phrase situation of airflow is here in particular understood in particular to be the pattern of airflow at the rotor blade.

The control devices and/or regulating devices of a wind turbine accordingly take into account the predetermined behavior of each rotor blade installed on the wind turbine in order to set the operating points of the wind turbine. However, the problem arises with this type of regulation and/or control that the behavior of the rotor blades changes in the course of their service life and as a result the operating point can no longer be set ideally solely by taking into account the predetermined rotor blade model.

Moreover, such an ageing process of the rotor blades can also not be taken into account in the rotor blade model because it is dependent on multiple factors which are also random. Thus, for example, erosion, namely in particular layers of paint becoming detached from the rotor blade, which occurs at the leading edges of the rotor blade, in particular in the outer region of the rotor blades, has a major influence on the flow behavior at the rotor blade surface or the rotor blade wall. Erosion is, however, in particular dependent on the quantity and quality of particles in the surrounding air of the respective wind turbine so that erosion which occurs cannot be predicted.

Accordingly, the predetermined situation of airflow onto the rotor blades in the regulated and/or set operating points after operating for a certain period of time no longer corresponds to the actual situation of airflow.

The German Patent and Trademark Office has conducted a search in the priority application and found the following prior art: WO 2012/122 669 A1 and U.S. Pat. No. 7,159,468 B2.

BRIEF SUMMARY

The present invention is directed to a wind turbine and a method for operation thereof which make it possible, in particular independently of the rotor blade behavior which changes over the course of the blade's service life, to operate the wind turbine in an essentially ideal or optimal operating point.

The invention relates to a wind turbine with at least one rotating part, in particular a rotor, with at least one rotor blade. Moreover, the wind turbine has at least one optical pressure sensor arranged on the rotor blade. Any optical pressure sensor which changes a preconfigured light, i.e., light with predetermined properties such as, for example, a predetermined wavelength, by means of fiber optic cables depending on a pressure exerted on the sensor can hereby serve as an optical pressure sensor.

In order to change the properties of the light, optical pressure sensors have, for example, mirrors or interference grids which are moved mechanically under the influence of pressure. Such sensors advantageously have the property that they have no metal parts and/or components and hence have a high electromagnetic compatibility. The light with altered properties thus carries information on the pressure which is actually exerted and/or fluctuations in pressure on the sensor and thus on the rotor blade, wherein this information can be evaluated. Fluctuations in pressure at the surface of the rotor blade, which is also called the rotor blade wall, are also referred to as fluctuations in wall pressure.

The invention is moreover based on the recognition that changes in pressure exerted on the rotor blade, which result in transient pressure values, can imply different situations of airflow onto the rotor blade. Spectra and/or in particular power density spectra are formed for the pressure values of a sensor, in order to carry out the evaluation. The situation of airflow onto the rotor blade can accordingly be determined from these spectra and/or power density spectra. The integration area thus has different power densities depending on the flow topology (laminar or turbulent boundary layer).

Pressure values or pressure differences acting on the rotor blade can accordingly be measured using the optical pressure sensors so that the actual situation of airflow onto the rotor blade or blades can be measured and does not need to be derived from a model. The actual situation of airflow can thus be taken into account during the regulation so that ageing processes of the rotor blades can also in particular be taken into account. It is moreover possible to use the optical pressure sensors continuously in contrast to conventional sensors because they are not susceptible to static electricity and/or lightning discharges.

According to a first advantageous embodiment, at least one rotor blade of the wind turbine has at least two optical pressure sensors on the high-pressure and/or low-pressure side of the rotor blade. According to a further advantageous embodiment, at least one rotor blade has four optical pressure sensors distributed over the high-pressure and low-pressure side.

By virtue of the arrangement of multiple distributed pressure sensors, pressure gradients can be measured in different regions of the surface of the rotor blade and hence different local flow situations, for example laminar and turbulent, or the local effective pitch angle and velocity of the oncoming airflow, can be measured and hence the transition regions of the flow situation can also be locally isolated. Information on the distribution of the velocity of the oncoming airflow and the pitch angle over the rotor periphery can be used to evaluate the wind field with respect to the wind shear (i.e., the change in wind speed over height) and the change in wind direction over height. This information can be used to operate the turbine optimally, for example in terms of power, noise or load.

According to a further advantageous embodiment, the or at least one of the optical pressure sensors is arranged in the region of the trailing edge, for example at 98% of the profile depth of the rotor blade. According to a particularly advantageous embodiment, it is arranged on the radially outwardly situated 30% to 40% of the rotor blade.

Transient pressure values, which act on the rotor blade in particular at the trailing edge, can be determined with an optical pressure sensor in the region of the trailing edge of the rotor blade. Pressure sensors in this region accordingly advantageously serve in particular to determine turbulence at the blade trailing edge. These fluctuations in pressure make it possible to conclude the emitted sound power of the rotor blades. To do this, spectra or power density spectra of the pressure values of the pressure sensors are for example formed again, wherein the power represents a measure of the emitted sound power in specific frequency ranges dependent on the blade geometry. In particular an increased emitted sound power occurs when the blade pitch angle and/or the generator torque are not adapted optimally to the wind conditions and as a result undesired turbulence and/or flow separation effects occur on the rotor blade wall. Accordingly, the fluctuations in pressure determined with the optical pressure sensors at the trailing edge advantageously need to be taken into account when setting the operating point to reduce noise by control set points or control variables being adapted, for example, depending on the amplitudes and the power of the spectra and the power density spectra. Noise emissions of the wind turbine can thus be advantageously minimized.

According to a further advantageous embodiment of the invention, at least one rotor blade has multiple optical pressure sensors arranged offset in the direction of flow. The angle of offset is here selected in particular in such a way that pressure sensors positioned downstream are not influenced by transition wedges of pressure sensors positioned upstream which occur.

Accordingly, the pressure sensors are arranged in such a way that transition wedges, in other words a wedge-shaped change from a laminar to a turbulent flow, which owing to a pressure sensor can occur in the direction of flow or downstream behind the pressure sensor, do not influence the measured values of pressure sensors following downstream or falsify their measured values. According to a further particular embodiment, the angle of offset is dependent on the profile of the rotor blade. The profile-dependent angle of offset—relative to a profile line of intersection which is oriented perpendicularly to the blade angle adjustment axis of the rotor blade—according to a further special embodiment hereby lies in the range from 5° to 20°, and is preferably 15°, beginning at the blade end at the blade profile leading edge (stagnation point) in each case on the high-pressure and low-pressure side as far as the trailing edge.

Pressure values, in particular transient pressure values and/or fluctuations in pressure, along the blade section can be determined by means of pressure sensors arranged in this way in the region of a blade section, and as a result transient pressure integration areas can be identified. Based on these pressure integration areas, the local operating points of the aerodynamic profile in section can be determined in terms of lift, drag and pitching moment, as well as the overall situation of airflow onto the blade, and the local behavior of the or each region of the blade in section can thus be evaluated. The pressure sensors are thus also used as anemometers for determining the overall situation of airflow onto the rotor and hereby in particular for determining the wind speed. Moreover, transition locations can be determined in order to be able to draw conclusions, by means of the transition location determination, about the build-up of ice, contamination, erosion or tower throughput effects during the operation of the wind turbine.

According to a further embodiment of the invention, the rotor blade has one or more depressions, wherein the maximum depth of the or each of the depressions is in particular 2 mm. Moreover, the or each of the depressions has at least one of the optical pressure sensors. The arrangement of the optical pressure sensors in depressions is advantageous because as a result the aerodynamics of the rotor blade are essentially preserved.

Moreover, according to a particular exemplary embodiment, the depressions are passages which have been introduced into the rotor blade, in particular by milling. Passages have, on the one hand, the advantage that they can be created simply, namely for example by milling. On the other hand, the passages have the advantage that the air that flows over the rotor blade can pass essentially in the direction of flow into the depressions and hence into the region of the optical pressure sensor.

According to a further embodiment, the depression or the depressions are produced or formed by a sacrificial layer which has been removed in the region of the respective depression. Accordingly, when producing the rotor blade, an additional layer which is not relevant for the stability of the rotor blade is applied to the rotor blade, in particular in the region in which optical pressure sensors are to be arranged. Even when it is here only a matter of one layer, multiple layers of material are included. This additionally applied layer is removed during production in certain regions, for example by milling, so that depressions, in particular passages, are created into which one or more optical pressure sensors are inserted.

Because the depressions are created by means of removed sacrificial layers, the stability of the blade is preserved in spite of the depressions, in comparison to rotor blades with no optical pressure sensors.

According to a further embodiment, the optical pressure sensors are fastened in the depressions by adhesive bonding. By virtue of the optical pressure sensors being adhesively bonded, screw holes or other mechanical changes to the rotor blade are avoided, so that the stability of the blade is essentially preserved, in comparison to a rotor blade with no optical pressure sensors.

According to a further embodiment, the rotor blade has one or more openings for connection to the outer surroundings and the inside of the rotor blade. Moreover, the rotor blade has multiple optical pressure sensors, each with at least one fiber optic cable. Multiple fiber optic cables are guided through at least one of the openings into the inside of the rotor blade. Accordingly, an opening therefore serves for the fiber optic cables of multiple optical pressure sensors so that the rotor blade has less than one opening per fiber optic cable. As a result, the stability of the rotor blade with optical pressure sensors is preserved as far as possible, in comparison to a rotor blade with no optical pressure sensors.

According to a further embodiment, the rotating part of the wind turbine has, in addition to the rotor blade, a spinner and a rotor hub. Moreover, the fiber optic cables for data transmission of the signals from the optical pressure sensors run inside the rotor blade as far as a region in the spinner and/or the rotor hub. Thus only optical cables for transmitting the signals, values and/or information from the optical pressure sensors extend in the region of the rotor blade. These optical cables are resistant to electromagnetic radiation and thus, for example, robust in the event of lightning strikes or other sources of electromagnetic interference.

According to a further embodiment, each optical pressure sensor has two fiber optic cables. A first fiber optic cable serves to supply light with predefined properties which is generated, for example, in the region of the spinner and/or the rotor hub, and a second fiber optic cable serves to return the light with properties altered by the pressure sensor.

According to a further embodiment of the invention, the wind turbine has a stationary part in addition to a rotating part. This stationary part of the wind turbine comprises in particular the nacelle of a wind turbine, in which for example the control and regulation of the wind turbine take place. According to this embodiment, the wind turbine is configured so as to transmit the signals, values and/or information identified by means of the optical pressure sensors from the rotating part into the stationary part. To do this, the wind turbine has, for example, wireless transmission of the signals, values and/or information or transmission of the information via slip rings.

An advantage of such transmission of the information from the rotating part into the stationary part of the wind turbine is that the evaluation of the signals, values and/or information and the regulation and control take place in a central region of the wind turbine and hence there is no need to provide any additional electronics in the rotor blade.

According to an embodiment, before transmission the signals, values and/or information from the optical pressure sensors are converted into electrical signals in the region of the spinner and/or the rotor hub and, according to a further more specific embodiment, amplifies the electrical signals and/or the optical signals. The susceptibility of the signals, values and/or information to failure is thus minimized, in particular during the transmission and/or conversion.

According to a further embodiment, the wind turbine has at least one signal processing device, in particular in the stationary part of the wind turbine. The signal processing device is configured to receive the values or pressure values, which are here also referred to as information or signals from the pressure sensors, and to supply and/or evaluate the values in particular for further processing. The signal processing device serves in particular to identify the overall situation of the airflow or at least a part of this situation onto the rotor blade or blades from the values. Accordingly, the signal processing device makes the signals from the optical pressure sensors, in particular signals which have been prepared and/or evaluated, available for other devices of the wind turbine in order to adapt, for example, the operating behavior of a wind turbine in accordance with the signals and/or information received to the actual situation of the airflow onto the rotor blades.

According to an embodiment, the wind turbine has a blade angle regulating system, wherein the signal processing device is connected to the blade angle regulating system in order to take signals from the optical pressure sensors, evaluated by the signal processing device, into account when regulating the blade angle, in particular by adapting the set points of the regulation.

According to a further embodiment, the wind turbine has a generator torque regulating system, wherein the signal processing device is connected to the generator torque regulating system. The connection serves to take signals from the optical pressure sensors, evaluated by the signal processing device, into account when regulating the generator torque.

Accordingly, regulating the blade angle and/or regulating the generator torque are possible dependent on the information or signals from the optical pressure sensors so that the operating point of the wind turbine can be set and/or regulated optimally or ideally.

Moreover, the invention is directed to a method for operating a wind turbine, in particular a wind turbine according to one of the abovementioned embodiments.

According to a first exemplary embodiment of the method, pressure values, in particular transient pressure values, are detected by at least one optical pressure sensor arranged on at least one of the rotor blades. Moreover, frequency spectra and/or power density spectra of the pressure values are determined and models of the airflow onto the rotor blade, which represent the current oncoming airflow situation or the progression of the oncoming airflow situation, are identified from the spectra, the power density spectra and/or spectrograms formed over time therefrom.

It is possible to determine, using the models of the oncoming airflow identified, whether the rotor blade pitch angle is set optimally in order to fulfil the necessary requirements and, in the event of suboptimal setting, can be altered so that an ideal or optimal operating point can be achieved.

It is furthermore possible to determine, using the models of the oncoming airflow identified, whether the rotor is oriented optimally with respect to the main wind direction. Any disadvantageous deviations can be compensated by nacelle azimuthal tracking.

According to a further embodiment of the invention, a turbulent flow is detected, by means of the model of the oncoming airflow, in the region of the trailing edge of the rotor blade and thus identifies the sound power generated by the rotor blade, in particular with the assistance of a model of the rotor blade, in other words for example of the rotor blade geometry. The sound power identified is supplied to the blade angle regulating system and a set point for the blade pitch angle of the blade angle regulation is set in the blade angle regulating system depending on the sound power, and in particular also on the wind speed. It is possible to reduce the sound power, which is emitted by the wind turbine, by means of regulating the blade angle taking into account the identified current emitted sound power which is calculated using the oncoming airflow model.

According to a further embodiment, set points of the blade angle regulating system and/or the regulating system of the generator torque of the wind turbine are adapted by means of the oncoming airflow model. As a result, an optimal operating point of the wind turbine is achieved taking into account the current behavior of the rotor blade, in particular in the case of "ageing" rotor blades as well.

According to a further advantageous embodiment, the turbulent flow in the region of the trailing edge, in particular on the low-pressure side, is detected by means of the oncoming airflow model and the amplitudes of low-frequency parts in the power density spectrum of the wall pressure fluctuations, in particular in the sub-1000 Hz frequency range, are determined by means of a signal processing device. The low-frequency parts in the power density spectrum are supplied to a blade angle regulating system and the set point for the blade angle regulating system for the relevant blade or for all the blades is set in the blade angle regulating system of the wind turbine in such a way that the amplitudes of the low-frequency parts in the power density spectrum of the wall pressure fluctuations are minimized.

Elevated amplitudes of the low-frequency parts in the power density spectrum of the wall pressure fluctuations are namely an indicator of undesired flow separation at the blade and result from false setting of the blade angle so that, when minimizing the said amplitudes, flow separation at the rotor blade is counteracted by adjusting the blade angle.

Further optimization of the operation or the operating points of the wind turbine is possible as a result.

BRIEF DESCRIPTION OF THE SEVERAL VIEWS OF THE DRAWINGS

Further advantages and exemplary embodiments of the invention are explained in detail below with reference to the drawings, in which.

DETAILED DESCRIPTION

Figure 1:
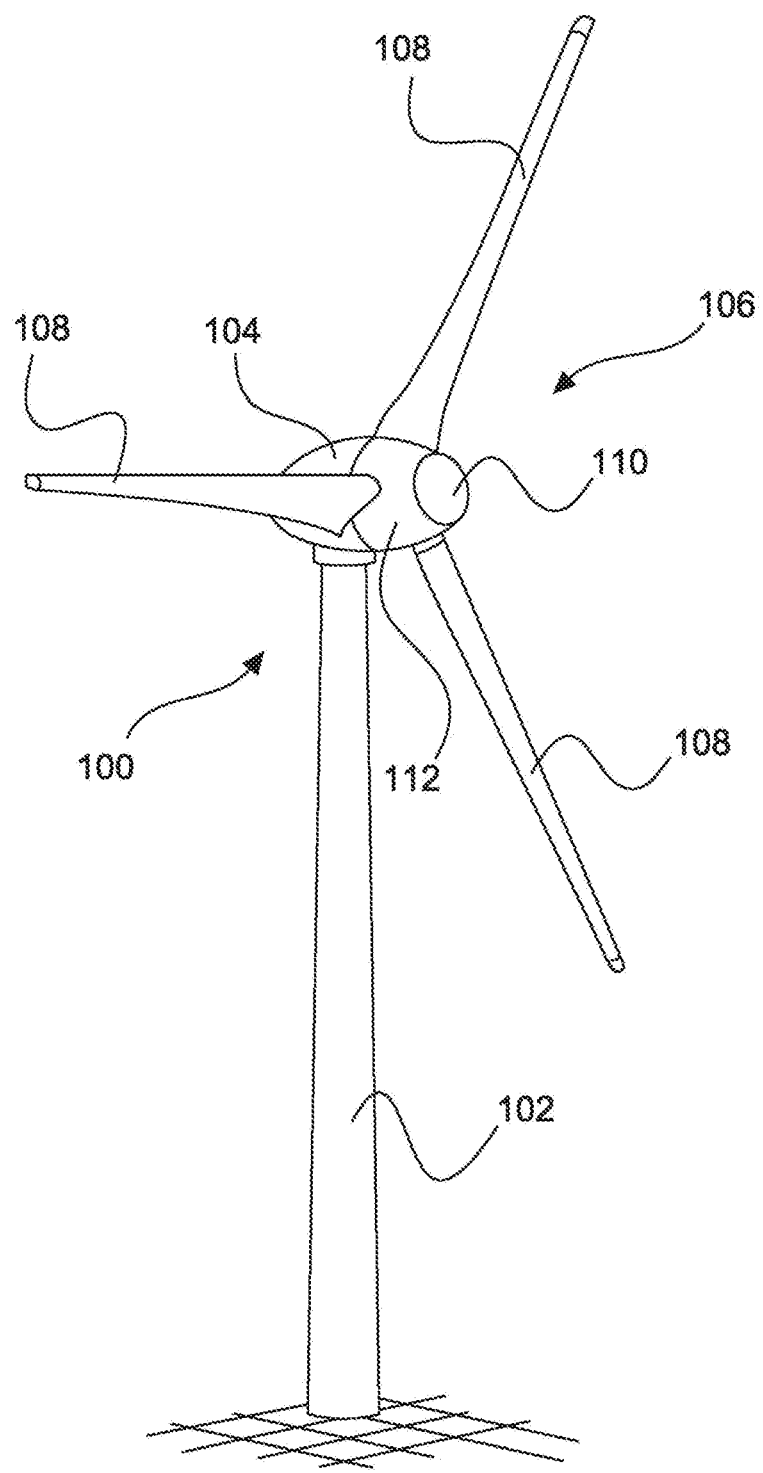
FIG. 1 shows a schematic view of a wind turbine according to an exemplary embodiment.

FIG. 1 shows a wind turbine 100 with a tower 102 and a nacelle 104. A rotor 106 with three rotor blades 108 and a spinner 110 is arranged on the nacelle 104. The rotor 106 moreover has a rotor hub 112 to which the rotor blades 108 are fastened. The blade angle, in other words the angle of rotation about an adjustment axis of the rotor blade which is essentially perpendicular to the axis of rotation of the rotor, can be set.

The rotor 106 with the rotor blades 108, the spinner 110 and the rotor hub 112 is also referred to as the rotating part of the wind turbine 100, and the nacelle 104 together with the tower 102 is referred to as the stationary part. During operation, the rotor 106 is set in rotational movement by the wind and consequently drives a generator (not shown) in the nacelle 104.

Figure 2:
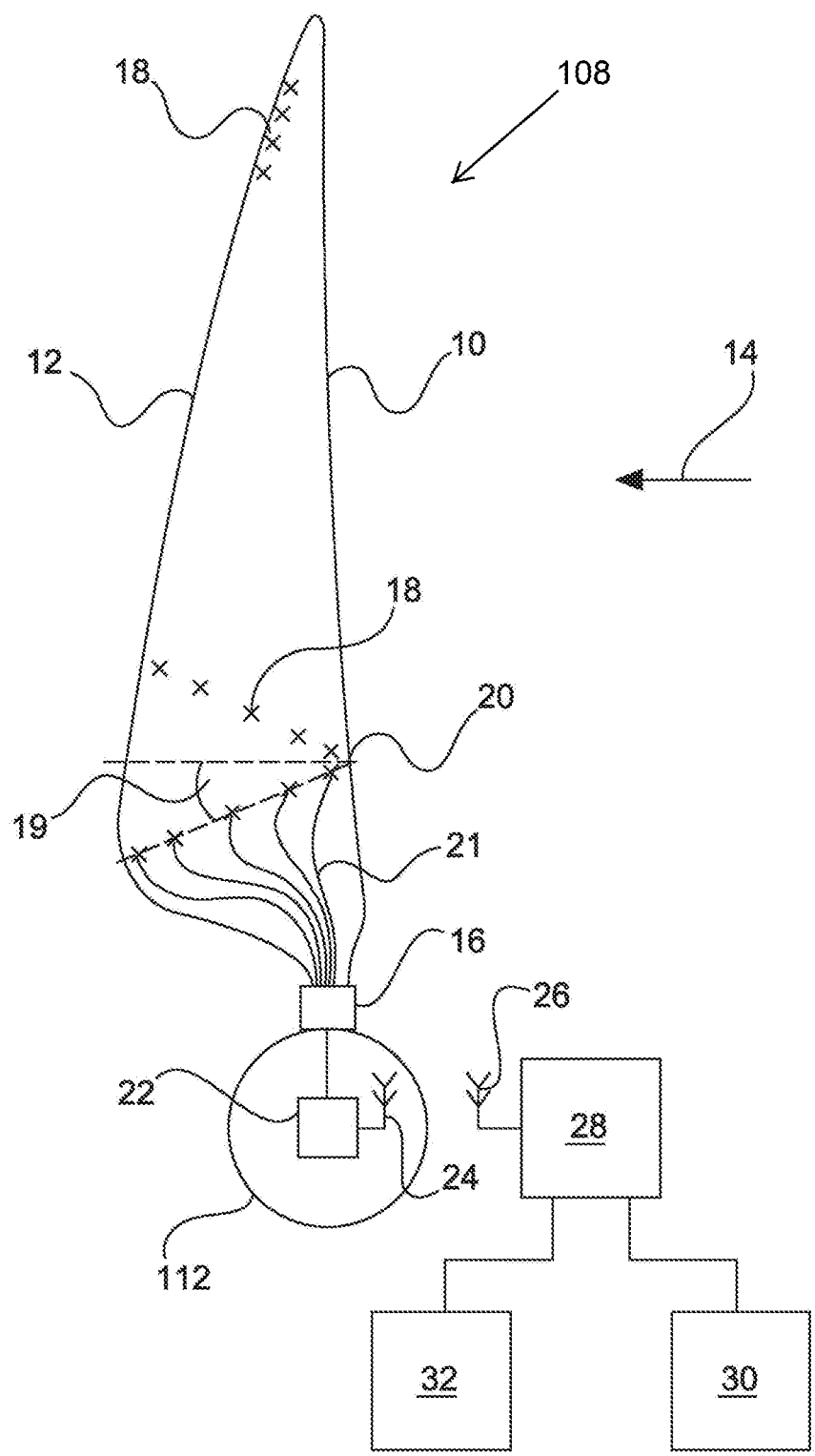
FIG. 2 shows a view of the low-pressure side of a schematically shown rotor blade according to an exemplary embodiment.

FIG. 2 shows a plan view of the low-pressure side of a rotor blade 108. The rotor blade 108 has a blade leading edge 10 and a blade trailing edge 12. The rotor blade 108 is oriented according to the wind direction in such a way that the wind streams along the blade surface, from the blade leading edge 10 towards the blade trailing edge 12, i.e., in the direction of oncoming airflow 14, which corresponds to the direction of the arrow 14. A blade adapter 16 is also shown by means of which the rotor blade 108 is fastened to the rotor hub 112.

Optical pressure sensors 18 are represented schematically by crosses which are arranged one behind the other in the direction of oncoming airflow 14 with an angle of offset 19. The angle of offset 19 is here selected such that pressure sensors 18 positioned downstream are not influenced by any transition wedges which may occur of pressure sensors 18 positioned upstream. Even though the pressure sensors 18 are shown here for greater clarity with a high angle of offset 19, an angle of offset 19 which is dependent on the profile is preferably selected within the range from 5° to 20°, starting from a profile line of section 20.

Fiber optic cables 21 lead from the pressure sensors 18 through the blade adaptor 16 into the rotor hub 112 and are there connected to a converter 22 which converts the optical signals from the optical pressure sensors into electrical signals and/or amplifies them before and/or after the conversion. The converter 22 is connected to an emitting device 24 which converts the electrical signals which are obtained from the optical signals into radio signals and transfers them to a receiving device 26.

The receiving device 26 is situated in the stationary part, for example in the nacelle 104 of the wind turbine 100. The receiving device 26 converts the signals received from the emitting device 24 back into electrical signals. The receiving device 26 is moreover connected to a signal processing device 28 in order to transfer to the latter the converted signals from the optical pressure sensors 18.

The signals, information, or values or pressure values which have been received from the optical sensors 18 are processed in the signal processing device 28 and/or, for example, a model of airflow onto the rotor blade 108 is identified or generated. The model of oncoming airflow, or at least extracted individual values or value ranges or progressions of the model of oncoming airflow over time are then supplied to a blade angle regulating system 30 and/or to a generator torque regulating system 32. Depending on the model of oncoming airflow, the set point of the regulation of the blade angle to be regulated is adapted in the blade angle regulating system 30 and/or the set point of the generator torque to be regulated is adapted in the generator torque regulating system 32 taking the model of oncoming airflow into account.

Figure 3:
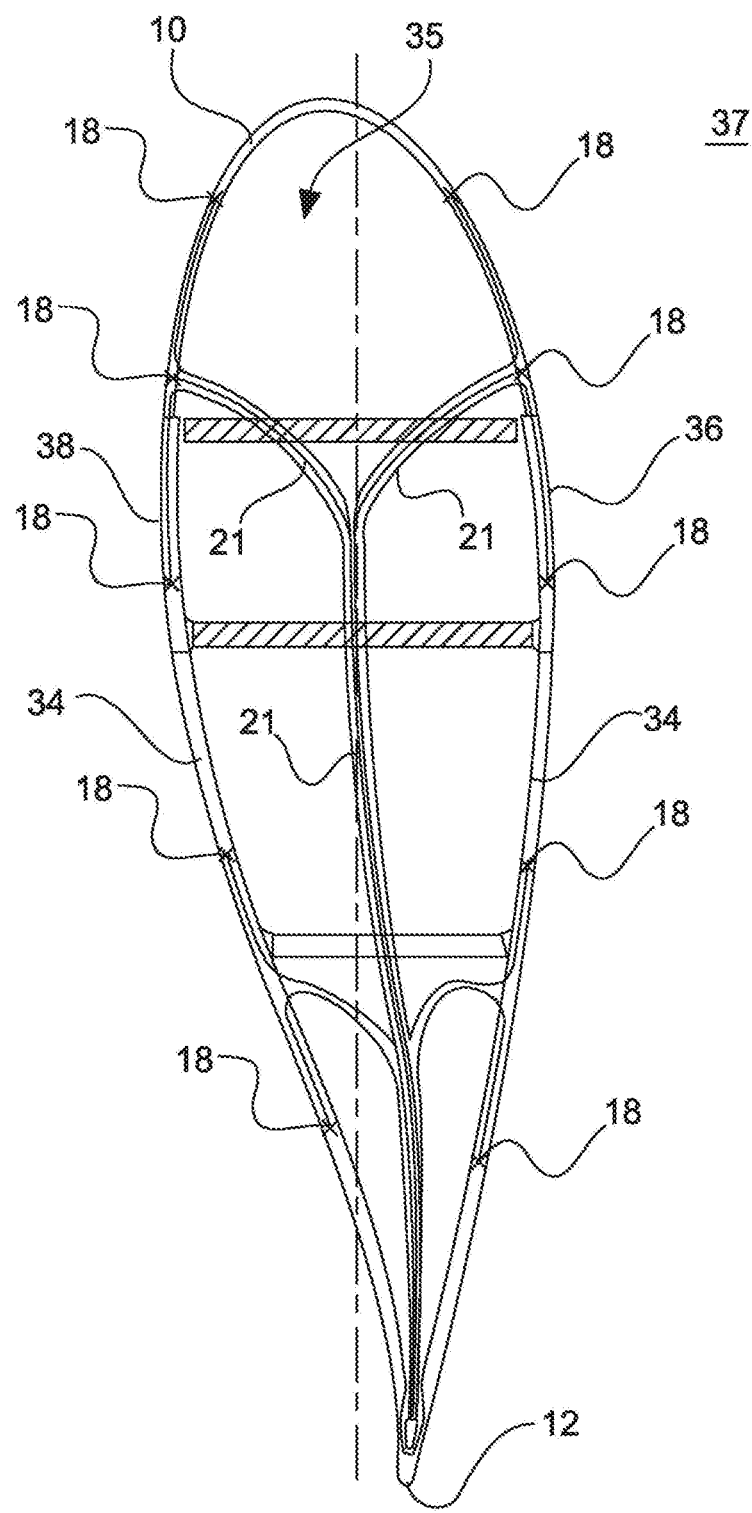
FIG. 3 shows a schematic view of a blade section of a rotor blade according to an exemplary embodiment.

FIG. 3 shows, by way of example, a blade section, wherein pressure sensors 18 are arranged peripherally on the blade wall 34 on the low-pressure side 36 and on the high-pressure side 38. The blade wall 34 divides the inside 35 of the rotor blade 108 from the outside 37.

The optical pressure sensors 18 are recessed inside milled passages (not shown) and adhesively bonded therein in such a way that they do not protrude above the blade wall. To achieve this, a sacrificial layer (not shown) was applied to the surface of the rotor blade 108 during the production of the rotor blade 108 and is removed by milling in the region of the optical pressure sensors 18.

Figure 4:
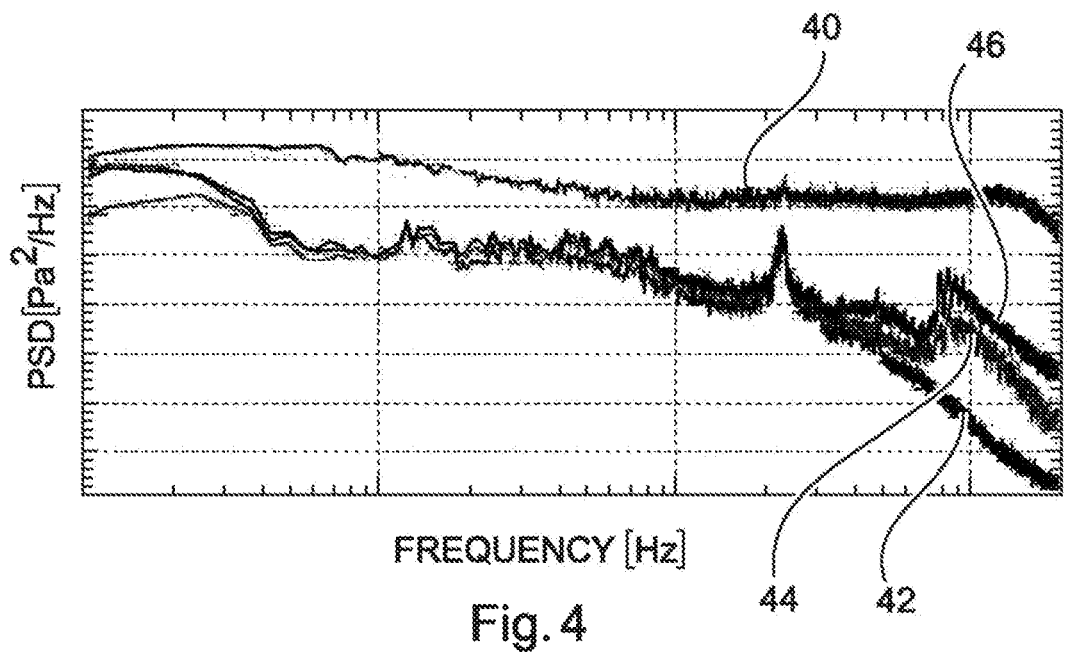
FIG. 4 shows a first power density spectrum recorded using optical pressure sensors.

FIG. 4 shows a graph of the power density spectra of four pressure sensors 18. The power density spectra are identified by the pressure sensors 18 by the pressure values which occur at the blade wall 34 being measured and identified. These pressure values are transient and accordingly change over time, wherein the change over time in the pressure values can be represented by means of a spectrum of the respective pressure sensor 18. The spectrum is formed, for example, in the signal processing device for each pressure sensor 18. Amplitudes or changing amplitudes of specific frequencies and/or frequency ranges can be detected with the aid of the spectral power density which can be determined from the respective spectrum of a sensor. The integration range of the power density spectrum can in particular also be evaluated.

It is known that different situations of oncoming airflow can be identified essentially unambiguously by evaluating the spectra of the pressure values. The integration range thus has different power densities depending on the flow topology (laminar or turbulent boundary layer).

Accordingly, the individual power density spectra of the sensors can be compared with each other by the arrangement of the pressure sensors 18, as is the case in FIG. 4. Under certain conditions, conclusions can be drawn about the position of a transition layer, for example by power density spectra, which differ from each other in certain ways, of pressure sensors which have a defined position. A transition layer is a term for a layer on the blade when, for example, the laminar flow turns into a turbulent flow. The power density spectra 40-46 are shown by way of example in FIG. 4. It should be noted that the power density spectrum 40 deviates essentially from the power density spectra 42, 44, 46, as a result of which it is possible to draw conclusions about the position of a transition layer.

Accordingly, the upper curve 40 hereby represents the power density spectrum 40 of an optical pressure sensor 18, within the range of which a turbulent flow is present. The lower three curves 42 to 46 correspond to the type of power density spectrum 42 to 44 which occurs in the case of pressure sensors 18, within the range of which a laminar flow exists. It is thus possible to determine a transition layer during the operation of the rotor blade 108 using the optical pressure sensors 18 in order to set the operating point of the wind turbine 100 optimally.

Figure 5:
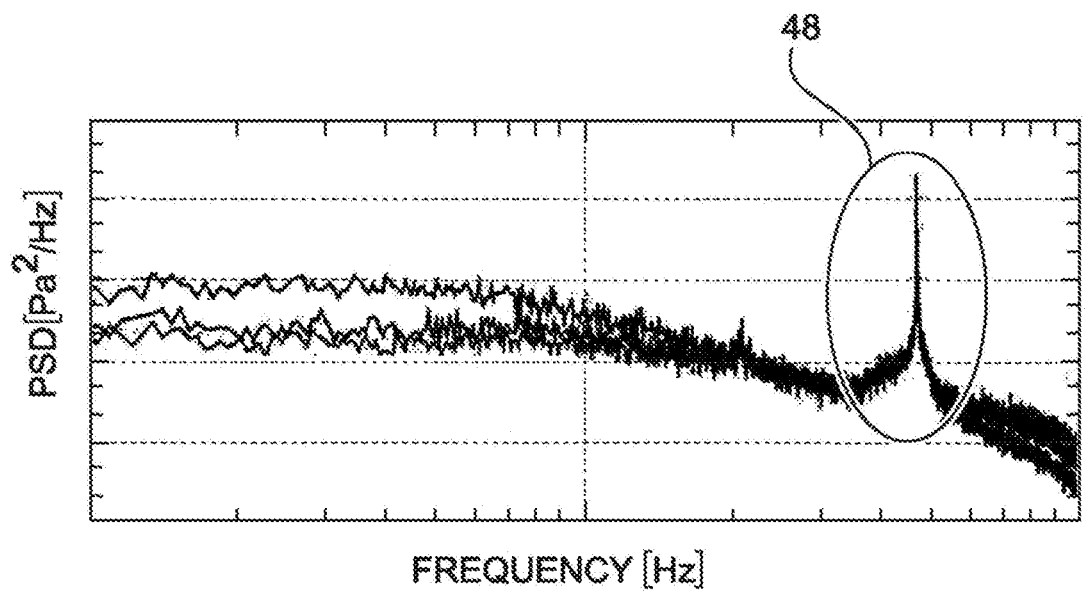
FIG. 5 shows a second power density spectrum recorded using optical pressure sensors.

FIG. 5 shows a graph of three power density spectra of the same pressure sensor 18 for different blade pitch angles. A relatively high amplitude occurs in a frequency range 48. This range 48 should be ignored here as a kind of interference.

However, amplitudes with different heights of the spectra in the low-frequency range at different blade angles are an indicator of the emitted sound power of the rotor blade 108. Accordingly, the curves have different values for different blade pitch angles. Accordingly, the angle of the rotor blade can be set in such a way that these amplitudes remain below a predetermined threshold value or at least at a minimum in order thus to minimize the emitted sound power of the rotor blade 108.

Accordingly, amplitudes of certain frequencies or certain frequency ranges of an optical pressure sensor 18, in particular in the region of the blade trailing edge 12, are an indicator of the emitted sound power which emanates from the rotor blade. These amplitudes grow as the emitted sound power increases. Accordingly a model of the oncoming airflow onto the rotor blade can be generated in the signal processing device using the identified spectra and power density spectra of the individual optical sensors 18 which are identified in the signal processing device 28 from the pressure values, which change over time, of the optical pressure sensors 18. The model of oncoming airflow thus corresponds to a representation of the prevailing pressure distribution at the blade wall of a rotor blade 108.

The model of oncoming airflow thus comprises, for example, multiple power density spectra, as are shown in FIGS. 4 and 5. In particular a power density spectrum is recorded for each sensor so that, for any point in time, the model of oncoming airflow can be formed from a power density spectrum for each sensor.

The model of oncoming airflow generated can thus be used in the overall regulation of the wind turbine 100 in order to set the operating point optimally, in particular by adjusting the rotor blades and/or the generator torque, so that the wind turbine 100 works as efficiently and quietly as possible and the mechanical stress is thus as low as possible.

The invention claimed is:

1. A wind turbine comprising:
    a rotor blade having a leading edge, a trailing edge, and high-pressure and low-pressure sides between the leading and trailing edges; and
    a plurality of optical pressure sensors arranged on the rotor blade, wherein the plurality of optical pressure sensors are arranged offset in a direction of air flow such that each optical pressure sensor, of the plurality of optical pressure sensors, positioned downstream is not influenced by transition wedges of any optical pressure sensor, of the plurality of optical pressure sensors, positioned upstream, wherein two or more of the plurality of optical pressure sensors are arranged on the high-pressure side or the low-pressure side offset in the direction of air flow, the offset arrangement of the plurality of optical pressure sensors has an angle of offset that is between 5° and 20° starting from a profile line of a section of the leading edge to the trailing edge.

2. The wind turbine according to claim 1, wherein the plurality of optical pressure sensors are on at least one of: the high-pressure side or the low-pressure side of the rotor blade.

3. The wind turbine according to claim 1, wherein the plurality of optical pressure sensors are arranged in a region of the trailing edge of the rotor blade.

4. The wind turbine according to claim 3, wherein the plurality of optical pressure sensors are arranged in a range between 95% and 100% of a profile depth of the rotor blade, wherein the plurality of optical pressure sensors are arranged on the radially outwardly situated 30% to 40% of the rotor blade.

5. The wind turbine according to claim 1, wherein the rotor blade has a depression, wherein at least one of the optical pressure sensors is arranged in the depression.

6. The wind turbine according to claim 5, wherein the at least one optical pressure sensor is fastened in the depression by adhesive material.

7. The wind turbine according to claim 1, wherein the rotor blade has one or more openings for connecting outer surroundings to inside of the rotor blade, the rotor blade having a plurality of optical pressure sensors, each with at least one fiber optic cable, wherein the fiber optic cables are guided through at least one of the one or more openings into the inside of the rotor blade.

8. The wind turbine according to claim 7 comprising a rotating part, a spinner, and a rotor hub, wherein the fiber optic cables are configured to provide data transmission from the plurality of optical pressure sensors to the inside of the rotor blade and further into at least one of the spinner and the rotor hub.

9. The wind turbine according to claim 8 comprising a stationary part, wherein the wind turbine is configured to transmit information obtained by the plurality of optical pressure sensors from the rotating part to the stationary part.

10. The wind turbine according to claim 8 wherein the data transmission comprises transmitting signals, the wind turbine comprising at least one of an amplifier for amplifying the signals from the plurality of optical pressure sensors and a converter for converting the plurality of signals into a respective plurality of electrical signals.

11. The wind turbine according to claim 10 comprising at least one signal processing device configured to receive the signals from the plurality of optical pressure sensors and to process the signals.

12. The wind turbine according to claim 11, comprising a blade angle regulating system, and the at least one signal processing device is connected to the blade angle regulating system and configured to regulate a blade angle of the rotor blade based on the signals from the plurality of optical pressure sensors.

13. The wind turbine according to claim 11 comprising a generator torque regulating system, wherein the signal processing device is connected to the generator torque regulating system in order to use the signals provided by the plurality of optical pressure sensors in regulating the generator torque.

14. The wind turbine according to claim 1, wherein the plurality of optical pressure sensors include all optical pressure sensors arranged on the rotor blade, and the plurality of optical pressure sensors are arranged on an outer surface the rotor blade.

15. The wind turbine according to claim 1, wherein two or more other optical pressure sensors of the plurality of optical pressure sensors are arranged on at least one other one of: the high-pressure side or the low-pressure side offset in the direction of air flow.

16. A method for operating a wind turbine comprising:
  detecting pressure values using a plurality of pressure sensors arranged on a rotor blade, the rotor blade having a leading edge, a trailing edge, and high-pressure and low-pressure sides between the leading and trailing edges, wherein two or more of the plurality of pressure sensors are arranged on the high-pressure side or the low-pressure side offset in a direction of oncoming airflow onto the rotor blade such that each pressure sensor, of the two or more of the plurality of pressure sensors, positioned downstream is not influenced by transition wedges of any pressure sensor of the plurality pressure sensors, positioned upstream, the offset arrangement of the plurality of optical pressure sensors has an angle of offset that is between 5° and 20° starting from a profile line of a section of the leading edge to the trailing edge;
  determining a change over time in the pressure values;
  identifying a power density spectra of the pressure values using a time progression of the pressure values; and
  determining a model of oncoming airflow onto the rotor blade using at least one of: a signal processing device, a frequency spectra, or the power density spectra.

17. The method according to claim 16, wherein flow properties in a region of the trailing edge are detected by the model of oncoming airflow and with an assistance of a model of the rotor blade, a sound power generated by the rotor blade is identified and supplied to a blade angle regulating system, wherein, in the blade angle regulating system of the wind turbine, a set point for the regulation of the blade angle setting is set as a function of at least one of identified sound power and current wind speed.

18. The method according to claim 16, wherein set points are adapted by the model of oncoming airflow for a blade angle regulation system and for regulating a torque of a generator of the wind turbine.

19. The method according to claim 16, wherein a turbulent flow in a region of the trailing edge on the low-pressure side of the rotor blade is detected by an oncoming airflow model, wherein low-frequency parts and values in a power density spectrum of rotor blade surface pressure fluctuations are identified by a signal processing device, wherein the identified low-frequency parts and values are supplied to a blade angle regulating system and a set point for the blade angle regulating system for the rotor blade is changed or influenced in such a way that the identified low-frequency parts and values are reduced as a result of the resulting blade angle.

20. The method according to claim 16, wherein two or more other optical pressure sensors of the plurality of pressure sensors are arranged on at least one other one of: the high-pressure side or the low-pressure side offset in the direction of oncoming airflow onto the rotor blade.

* * * * *